United States Patent Office

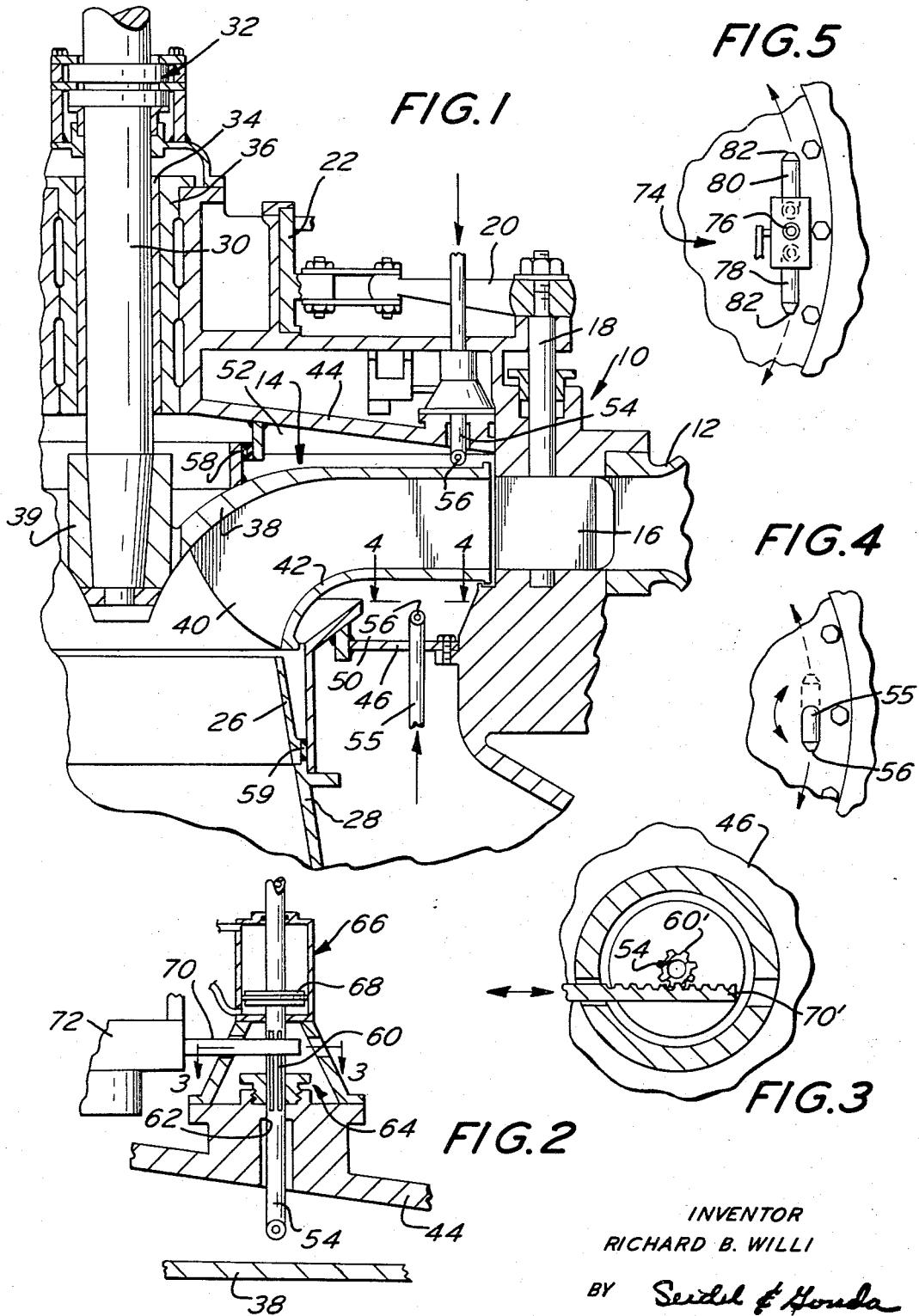

3,370,828
Patented Feb. 27, 1968

3,370,828
MEANS TO CONTROL AXIAL THRUST IN
HYDRAULIC MACHINES
Richard B. Willi, Norristown, Pa., assignor to Baldwin-Lima-Hamilton Corporation, Philadelphia, Pa., a corporation of Delaware
Filed Dec. 5, 1966, Ser. No. 599,027
10 Claims. (Cl. 253—26)

ABSTRACT OF THE DISCLOSURE

The disclosure relates to a means to control axial thrust in hydraulic machines. Axial thrust in hydraulic machines such as turbines, pumps and pump-turbines may cause serious damage to the main thrust bearing in the machine. Means are provided for precisely controlling the axial thrust in hydraulic machines. Trapped fluid above and below the runner in hydraulic turbines causes pressure to be applied on the runner and a resulting axial thrust. Pressure pipes which emit fluid jets are utilized to either increase or decrease whirl above and below the runner and thus accurately control axial thrust in the hydraulic machines.

---

This invention relates to a means to control axial thrust in hydraulic machines and more particularly to the utilization of fluid jets to control whirling fluid above and below the runners in hydraulic machines.

It is to be understood that the term "hydraulic machines" includes turbines, pumps and pump-turbines. Hydraulic machines particularly those of the low specific speed Francis type are generally provided with runners which have a relatively long radial dimension towards their outer periphery as compared to their eye or throat diameter. This results in large surface areas above and below the runner walls. It is known that water enters above and below runner walls and fills the spaces between the rotating runner walls and the adjacent stationary covers. The water enters the spaces through the peripheral runner clearance. The water in the spaces is trapped to some extent by the small restraining clearances at the runner seals. Since the water is in contact with the rotating runner surface, it has imparted to it a varying degree of whirling or vortex flow caused by such contact. This results in the buildup of pressure variations between the outer periphery of the runner and the runner seals. Depending upon the resultant direction of the pressure variations, upward or downward forces may be exerted on the runner.

The forces exerted result in axial loads on the runner shaft thrust bearing. The loads may become excessive and must be controlled in order to prevent excessive undesirable load conditions on the thrust bearing.

It is desirable to reduce the upward forces exerted on the runner to a value less than the weight of the rotating parts so that the main thrust bearing need not be designed to accept forces from opposite directions. Upward forces should be avoided in order to keep a steady and positive downward force on the main thrust bearing, which is designed to withstand such force. Should the runner be periodically lifted from the main thrust bearing, hydraulic disturbances and eventual damage to both upward and downward thrust bearings would result. Control of downward thrust forces is also desirable in order that the size of the thrust bearings can be kept smaller and the cost thereof can be minimized.

It is an object of the present invention to provide a means for controlling pressure distribution on a runner of a hydraulic machine.

It is another object of this invention to provide a means for preventing excessive wear and damage to thrust bearings in a hydraulic machine.

It is yet another object of this invention to provide pressure pipes which emit fluid jets and which extend into spaces above and below the runner walls of a hydraulic machine for increasing the downward pressure on the runner of such a machine.

It is a further object of this invention to provide pressure pipes which emit fluid jets which can be utilized to decrease the upward force exerted on the runner of a hydraulic machine.

It is a still further object of this invention to provide pressure pipes which emit fluid jets within spaces above and below the runner of a hydraulic machine and which can provide for the alternative choice of reducing or increasing axial forces on the main shaft of the hydraulic machine and thus enable smaller size thrust bearings to be utilized.

It is still another object of this invention that, by the provision of pressure pipes which emit fluid jets in a manner to be described hereinafter, forces acting upon the runner of a hydraulic machine may be accurately controlled in accordance with the operating condition of the hydraulic machine.

It is another object of this invention to provide a means for improving the smoothness of operation of a hydraulic machine.

Other objects will appear hereinafter.

One solution to the instant problem has been set forth in my prior co-pending application Ser. No. 538,172, filed Mar. 23, 1966. Therein, a multiple vane arrangement was provided above and below the runner of a hydraulic machine. The invention described in said prior co-pending application is highly effective and the present invention is an alternative construction for producing the same result.

The above enumerated and other objects of the present invention are accomplished by providing a fluid jet arrangement in the spaces above and below the runner walls. The fluid jet arrangement permits even more precise thrust control than the multiple vane arrangement described in my co-pending application. This is due to the infinite pressure variation which is available by use of a fluid jet control.

In accordance with the present invention pressure pipes are provided in spaces above and below the runner of the hydraulic machine. A single pressure pipe may be provided above the runner with means associated therewith for rotating the same. Thus, the pressure pipe may be utilized to either increase the whirling in the space above the runner or may decrease the whirling depending upon the direction of the nozzle of the pipe. A single pressure pipe may also be provided below the runner and may also be rotatable to either cooperate with or counteract the whirling in the space below the runner. Since vortex pressure is greater at the periphery and smaller toward the hub of the runner when rotating flow with centrifugal effects is prevalent, a control of the degree of rotating flow at the periphery is used for controlling the pressure distribution over the surface areas of the runner. This results in a control of the resulting forces on the thrust bearings.

The pressure pipes both above and below the runner may be vetically shiftable to permit even more precise control of the pressure distribution of the whirling flow on the runner. Suitable rack means may be utilized to rotate the pressure pipes to the desired position. Any suitable means may be utilized for supplying fluid under pressure to the pressure pipes. For example, fluid under pressure may be supplied from the main pressure pipe to which the hydraulic machine is connected or from a separate pumping system.

Two or more pressure pipes may be provided in each space. The pressure pipes may be located at spaced points and may be adapted to function together to control axial thrust.

A modification of the present invention provides a pair of pressure pipes above and below the runner of the hydraulic machine. One of the pressure pipes in each set is offset 180° with respect to the other pressure pipe in said set. Suitable valving is provided for insuring flow of fluid under pressure to either one or the other pipes alternatively. The provision of two pressure pipes above and below the runner eliminates the necessity for rotating the pressure pipes. Rotation of the pressure pipe is necessary when only a single pressure pipe is utilized.

For the purpose of illustrating the invention, there are shown in the drawings forms which are presently prefered; it being understood, however, that this invention is not limited to the precise arrangements and instrumentalities shown.

FIGURE 1 is a partial section view of any hydraulic machine constructed in accordance with the principles of the present invention;

FIGURE 2 is a section view of the means for vertically shifting and rotating the pressure pipe of the present invention;

FIGURE 3 is a section view taken along line 3—3 in FIGURE 2;

FIGURE 4 is a view taken along line 4—4 in FIGURE 1; and

FIGURE 5 is a partial plan view of an alternative embodiment of the present invention.

Referring to the drawing in detail, wherein like numerals indicate like elements, there is shown in FIGURE 1 a pump-turbine designated generally by the reference numeral 10. While the turbine shown is of the low specific speed Francis type, it is to be understood that this invention is not to be limited to a distinct type of hydraulic machine. The invention may be used in various types of hydraulic machines including turbines pump-turbines and pumps.

The pump-turbine 10 is provided with a spiral casing 12. Water flows through the casing 12 to the runner 14 of the pump-turbine when it is operating as a turbine. The pump-turbine 10 is provided with a plurality of wicket gates 16 which are rotatably mounted by stems 18. The stems 18 are connected to an arm 20 and a shifting ring 22 which cooperate to control the adjustment of the wicket gates 16.

Water which enters the pump-turbine 10 through the spiral casing 12 is adapted to flow through a discharge ring 26 into a draft tube 28. The pump-turbine 10 is provided with a centrally mounted shaft 30 which is mounted in a radial bearing 34. The shaft 30 has a thrust bearing assembly 32 at its upper end. A bushing 36 surrounds the bearing 34.

The runner 14 is connected to the lowermost end of the saft 30. The runner 14 comprises a hub 39 and a disc 38 which is connected to the shaft 30 for rotation therewith. The disc 38 is provided with a plurality of blades 40 attached thereto. The blades 40 have the outer ends thereof joined by a discharge band or shroud 42. The hub 39 and disc 38 to which the blades 40 and the discharge band 42 are joined, all comprise the runner 14.

The pump-turbine 10 is provided with a stationary head cover plate 44 which does not rotate with the runner 14. The pump-turbine 10 is also provided with a stationary bottom cover plate 46 which does not rotate with the runner 14. The outer surface of the discharge band 42 and the inner surface of the stationary bottom cover plate 46 cooperate to define a space 50. The space 50 is beneath the runner 14 of the pump-turbine 10. The stationary head cover plate 44 and the outer surface of the disc 38 cooperate to define a space 52 therebetween. The space 52 is above the runner 14 of the pump-turbine 10.

Pressure pipes 54 and 55 extend through the stationary head cover plate 44 and the stationary bottom cover plate 46 into the spaces 52 and 50, respectively. The pressure pipes 54 and 55 are preferably identical in construction and therefore only pressure pipe 54 will be discussed herein in detail. Like structure on pressure pipe 55 will be indicated with a prime notation of the same reference numeral.

The pressure pipe 54 has a nozzle 56 at the lowermost end thereof. The pressure pipe 54 is rotatable to two predetermined positions as exemplified by the solid line and phantom line positions shown in FIGURE 4 of the drawing. Seals 58 and 59 may be provided in spaces 50 and 52 in a conventional manner.

Referring now more particularly to FIGURES 2 and 3 of the drawing, it is seen that the pressure pipe 54 is splined at 60 to permit the pressure pipe to be vertically shiftable in the space 52. The structure for vertically moving the pressure pipe 54 will be set forth in detail. Similar structure may also be used to vertically shift the pressure pipe 55 in the space 50.

An opening 62 is provided in the stationary head cover plate 44 through which the pressure pipe 54 may extend. A stuffing box 64 may be provided to prevent leakage. The pressure pipe 54 has a piston 68 integrally connected thereto. The piston 68 is housed within a double-acting cylinder 66. The piston 68 may be automatically moved by a remote control means in accordance with the desired vertical position of the pressure pipe 54.

A rack member 70 is provided with teeth which are adapted to mesh with splines 60 on the pressure pipe 54. Movement of the rack 70 will cause the pressure pipe 54 to rotate. The rack 70 may be connected to a two-position control motor 72. The control motor is adapted to move the rack so that the nozzle 56 of the pressure pipe 54 will be in one of two possible positions which are illustrated in full and phantom line in FIGURE 4. Thus, it is readily seen that the pressure pipes 54 and 55 may be vertically shifted within the spaces 52 and 50, respectively, and may also be rotated into one of two positions by means of racks meshing with splines on the pressure pipes.

Various other means could be utilized to provide for vertical shifting of the pressure pipes 54 and 55. For example, the pressure pipes could be threaded and retraction or extension accomplished by a gear internally threaded to mate with the threads on the pressure pipes. The gear could be held in a fixed axial position and driven by an electric motor.

FIGURE 5 discloses another embodiment of the present invention. In this embodiment, a multiple conduit arrangement 74 is utilized. The multiple conduit arrangement includes main feed line 76 which may also have a double-acting cylinder operatively connected thereto so that it can be vertically adjusted. The multiple conduit arrangement 74 includes a pair of pressure pipes 78 and 80 which have nozzles 82 on their outermost ends. The pressure pipes 78 and 80 are offset 180° with respect to each other and are adapted to emit fluid under pressure in opposite directions. A multiple conduit arrangement 74 may be provided in each of the spaces 50 and 52 in lieu of the pressure pipes 54 and 55. Suitable valving may be provided so that pressure will emanate from either pressure pipe 78 or pressure pipe 80. Because a pair of pressure pipes 78 and 80 are utilized it is unnecessary to provide for rotation of the pressure pipes. The valving may be automatically controlled so that fluid under pressure will emanate from the desired pressure pipe 78 or 80 in accordance with the operating characteristics of the hydraulic machine.

If fluid in spaces 50 and 52 is whirling with identical velocities, the pressure distribution in the spaces will be similar and the downward thrust on the runner 14 will balance the upward thrust on the runner. However, if the fluid is not whirling in space 50 and is whirling in space 52, the pressure in space 50 will be substantially constant from the outside diameter of the runner to the seal 53, whereas, the whirling fluid in space 52 will have the same pressure as in space 50 at the outside diameter of the runner 14, but the pressure will decrease with decreasing radius and at seal 58, the pressure will be appreciably less than the pressure at the seal 59 in the space 50. This will result in a net upward force on the runner 14. The reverse of this condition will create a downward force. By use of the pressure pipes 54 and 55, fluid jets may be directed either to increase or destroy whirl in either space 50 or 52, and thus correct any imbalance of pressure on the runner 14. Upward or downward forces may be accurately controlled by means of fluid jets which emanate from the pressure pipes 54 and 55 or 78 and 80 (depending upon which embodiment of the invention is utilized).

The pump-turbine 10 may be operated in the following manner. The flow of water through the spiral casing 12 is controlled by the position of the wicket gates 16 which are positioned by means of the shifting ring 22. Water flows through the blades 40 and discharges through the discharge ring 26 into the draft tube 28. Rotary movement is imparted to the blades 40 by such water flow. The rotary movement may be transmitted by shaft 30 to any suitable driven mechanism which is usually an electric generator.

The shifting ring 22 is mounted on the casing above the stationary head cover plate 44 and is preferably operated by servo-motors responsive to the rotor speed as is well known, and therefore, not shown.

Water may enter the spaces 50 and 52 through the peripheral runner clearance. The water in the spaces 50 and 52 is trapped to some extent by the small restraining clearances at the runner seals 58 and 59, and since such water is in contact with the rotating runner surfaces, it has imparted to it a varying degree of whirling or vortex flow caused by such contact. The whirling in either spaces 50 or 52 may be accurately controlled by means of the present invention. Fluid under pressure is transmitted through the nozzles 56 of the pressure pipes 54 and 55. Depending upon the direction of the flow of fluid under pressure from the pressure pipes, the whirling flow will either be increased or decreased. To vary the direction of fluid under pressure from the pipes 54 and 55, it is merely necessary to rotate the pipes to the desired direction of flow. In the alternative embodiment disclosed in FIGURE 5, direction of flow may be varied by merely operating a valve to direct the flow through either pressure pipe 78 or pressure pipe 80.

Thus, excessive or all upward thrust in accordance with the desired characteristics is avoided, and a steady and positive downward thrust may be maintained on the thrust bearing 32, which is designed for this purpose. Periodic lifting of the runner from the thrust bearing 32 is avoided so that dynamic disturbances and eventual damage to both upward and downward thrust bearings is substantially prevented.

The present invention may be embodied in other specific forms without departing from the spirit or essential attributes thereof and, accordingly, reference should be made to the appended claims, rather than to the foregoing specification as indicating the scope of the invention.

I claim:

1. A hydraulic machine comprising a runner, a rotatable shaft connected to said runner, said runner including a plurality of blades and a top wall, the top wall of said runner having a substantially flat portion defining a generally horizontal plane, a stationary head cover plate mounted over said runner, said head cover plate and said top wall of said runner defining a space therebetween, and pressure pipe means in said space for emitting a fluid jet to vary the whirling of water which is trapped in said space said pressure pipe means including a discharge port for directing the fluid jet in a generally horizontal plane substantially parallel to the generally horizontal plane defined by the top wall of the runner.

2. A hydraulic machine as set forth in claim 1 including a discharge band connected to the ends of said blades said discharge band having a substantially flat portion defining a generally horizontal plane, said hydraulic machine including a stationary bottom cover plate, said bottom cover plate and said discharge band defining a second space therebetween, and pressure pipe means for emitting a fluid jet in said second space for varying the whirling of water which is trapped in said second space said pressure pipe means in said second space having a discharge port, said discharge port directing the fluid jet in a horizontal plane parallel to the generally horizontal plane defined by the discharge band.

3. A hydraulic machine as set forth in claim 2 wherein said pressure pipe means in said second space is vertically adjustable in said second space and is rotatable to vary the direction of the fluid jet emanating therefrom.

4. A hydraulic machine as set forth in claim 1 wherein said pressure pipe means is vertically adjustable within said space and rotatable to vary the direction of the fluid jet emanating therefrom.

5. A hydraulic machine as set forth in claim 1 wherein said pressure pipe means includes a pair of pressure pipes facing in opposite directions and being adapted to alternatively emit fluid jets.

6. A pump-turbine comprising a rotatable shaft, a runner connected to said rotatable shaft, a cover plate mounted over said runner and stationary with respect thereto, a housing stationary with respect to said runner, said runner including a plurality of blades fixedly connected thereto, a band integrally connected to the ends of said blades, said runner and said cover plate cooperating to define a first space therebetween, said band and said stationary housing cooperating to define a second space therebetween, at least one pressure pipe in said first space adapted to emanate a fluid jet to either increase or decrease whirling of fluid trapped in said first space said pressure pipe having a discharge port at one end thereof, said discharge port directing the fluid jet in a generally horizontal plane, and at least one pressure pipe in said second space to either increase or decrease whirling of fluid trapped in said second space said pressure pipe in said second space having a discharge port at one end thereof, said discharge port on said pressure pipe in said second space directing the fluid jet in a generally horizontal plane.

7. A pump-turbine as set forth in claim 6 wherein said pressure pipe in said first space is vertically adjustable and rotatable to vary the direction of the fluid jet emanating therefrom.

8. A pump-turbine as set forth in claim 6 wherein said second pressure pipe is vertically adjustable and rotatable to vary the direction of the fluid jet emanating therefrom.

9. A hydraulic machine comprising a rotatable shaft, a runner connected to said rotatable shaft, a stationary head cover plate mounted over said runner and stationary with respect thereto, a bottom cover plate stationary with respect to said runner, said runner including a plurality of blades fixedly connected thereto, a band integrally connected to the ends of said blades, said runner and said head cover plate cooperating to define a first space therebetween, said band and said bottom cover plate cooperating to define a second space therebetween, a pair of pressure pipes in said first space adapted to emanate a fluid jet to either increase or decrease whirling of fluid trapped in said first space, a pair of pressure pipes in said second space to either increase or decrease whirling of fluid trapped in said second space, said pair of pressure pipes in said first space having nozzles thereon facing in opposite directions and being adapted to alternatively emit fluid jets in opposite directions.

10. A hydraulic machine as set forth in claim 9, wherein said pair of pressure pipes in said first space are vertically adjustable and said pair of pressure pipes in said second space having nozzles thereon facing in opposite directions and being adapted to alternatively emit fluid jets in opposite directions.

References Cited

UNITED STATES PATENTS 3,279,378   10/1966   Sproule _____ 253—26 X

FOREIGN PATENTS 500,808   1/1920   France.
806,063   12/1958   Great Britain.
330,261   7/1958   Switzerland.

EVERETTE A. POWELL, JR., *Primary Examiner.*